(12) United States Patent
Guldenfels et al.

(10) Patent No.: US 8,276,747 B2
(45) Date of Patent: Oct. 2, 2012

(54) MODULE FOR A MODULAR BELT AND A DRIVING SPROCKET FOR EASY CLEANING

(75) Inventors: Dieter Guldenfels, Pfeffingen (CH);
Marco Lucchi, Munchestein (CH)

(73) Assignee: Habasit AG, Reinach (CH)

( * ) Notice: Subject to any disclaimer, the term of this patent is extended or adjusted under 35 U.S.C. 154(b) by 405 days.

(21) Appl. No.: 11/771,419

(22) Filed: Jun. 29, 2007

(65) Prior Publication Data
US 2009/0000921 A1  Jan. 1, 2009

(51) Int. Cl.
*B65G 23/06* (2006.01)
(52) U.S. Cl. ........ 198/834; 198/850; 198/851; 198/852; 198/853
(58) Field of Classification Search .......... 198/850, 198/851, 852, 853
See application file for complete search history.

(56) References Cited

U.S. PATENT DOCUMENTS

| | | | |
|---|---|---|---|
| 2,770,977 A | 11/1956 | Beckadolph et al. | |
| 4,925,016 A | 5/1990 | Lapeyre | |
| 5,020,656 A * | 6/1991 | Faulkner | 198/494 |
| 5,586,643 A * | 12/1996 | Zabron et al. | 198/853 |
| 5,662,541 A | 9/1997 | Roovers | |
| 6,516,944 B2 * | 2/2003 | Guldenfels | 198/853 |
| 6,564,933 B2 * | 5/2003 | Morimoto et al. | 198/850 |
| RE38,607 E | 10/2004 | Guldenfels et al. | |
| 7,134,545 B1 | 11/2006 | Smith | |

FOREIGN PATENT DOCUMENTS

| | | |
|---|---|---|
| WO | WO 96/15054 | 5/1996 |
| WO | WO 98/33728 | 8/1998 |
| WO | WO 03/076311 | 9/2003 |

\* cited by examiner

*Primary Examiner* — Kavel Singh
(74) *Attorney, Agent, or Firm* — Hodgson Russ LLP (57) ABSTRACT

A modular conveying system with sprockets engaging the modules such that they do not cover any link gaps but are positioned between the link gaps. The module is characterized by link structures having link pairs that are spaced apart sufficiently at a distance to allow the sprockets to be located between the link pairs. Positioning the sprockets between the link pairs leaves the hinge gaps uncovered and thus allows free access to the hinge gap for cleaning.

14 Claims, 8 Drawing Sheets

MODULE FOR A MODULAR BELT AND A DRIVING SPROCKET FOR EASY CLEANING

FIELD OF INVENTION

The present invention relates to conveying systems, and specifically to modular conveying belts.

BACKGROUND OF THE INVENTION

Modular belts, e.g., flat top belts, are widely used for applications where food is transported in direct contact with the belts. Belts and equipment for such transport must be regularly cleaned in order to avoid contamination due to contact of the food with decomposed residual matter or bacteria. Cleanability is therefore an important requirement for modular belts and efforts have been made to improve cleaning, to reduce cleaning time, and to reduce costs associated with cleaning.

Modular belts are assembled from individual modules linked by hinges to form a conveyor belt. The modules are typically made from solid plastics with a smooth surface. The plastic material is selected from materials that are approved for direct contact with foodstuff. These types of plastic modules are normally well cleanable. The main problem associated with cleaning occurs in the hinge area where the individual modules are linked together. The hinge area typically has gaps where foodstuff penetrates and may become trapped. These deposits of residual food matter are difficult to remove. In addition, the cleaning problem is often made worse by sprockets that are driving the belt. The sprocket teeth may press the residual food matter into the hinge area where it can become trapped and difficult to remove.

A modular conveying belt used in the food industry is shown in U.S. Pat. No. 4,925,016. In order to drive the conveying belt, a transverse rib is arranged on the underside of the module bodies. The rib is disposed transverse to the conveying direction. The conveying belt is driven by a plurality of parallel, spaced-apart toothed drive wheels that have drive teeth that are positioned against the transverse ribs. Guide teeth are provided on the toothed drive wheel in addition to the drive teeth. The guide teeth engage in the gap between two adjacent link ends of interengaging modules and thus guide the modular conveying belt laterally. This conveying apparatus has the disadvantage that the toothed drive wheels have guide teeth in addition to the drive teeth. Also, the additional guide teeth make cleaning more difficult, and there is a risk of conveyable articles passing onto the underside of the conveying belt and being pressed by the guide teeth into the narrow interspace between two adjacent link ends.

An improved design has been proposed by U.S. Pat. No. Re 38,607, assigned to Habasit AG, the assignee of the present invention. Although the problem of the additional tracking teeth was eliminated and thus the cleanability improved, these sprockets still cover the hinge area and therefore may hinder the accessability of cleaning fluid to the hinge gaps. The contact of the hinges with the sprocket teeth is needed in order to allow the belt to be tracked by the sprocket. Also, the sprocket is kept aligned with a certain position of the belt so that the proper engagement of the sprocket teeth with the hinge structure is maintained. Accordingly, there is a need for an improved system that maintains proper sprocket engagement yet allows for exposure of the hinge area for cleaning.

SUMMARY OF THE INVENTION

The present invention meets the above-described need by providing a conveying system with sprockets positioned such that they do not cover any link gaps but are positioned in between them. The present invention provides for this arrangement by means of a special hinge design characterized by link structures having link pairs, that are spaced apart sufficiently at a distance to allow the sprockets to be located between the link pairs. Positioning the sprockets between the link pairs leaves the hinge gaps uncovered and thus allows free access to the hinge gap for cleaning. In order to provide belt tracking, the center transverse rib may be shaped such that the engaged sprockets cannot move sideways (transversal to the belt running direction), the transverse rib may be provided with at least one protuberance for tracking, or the sprocket may be fixed to the shaft in combination with edge guiding of the belt or the like.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Figure 1A:
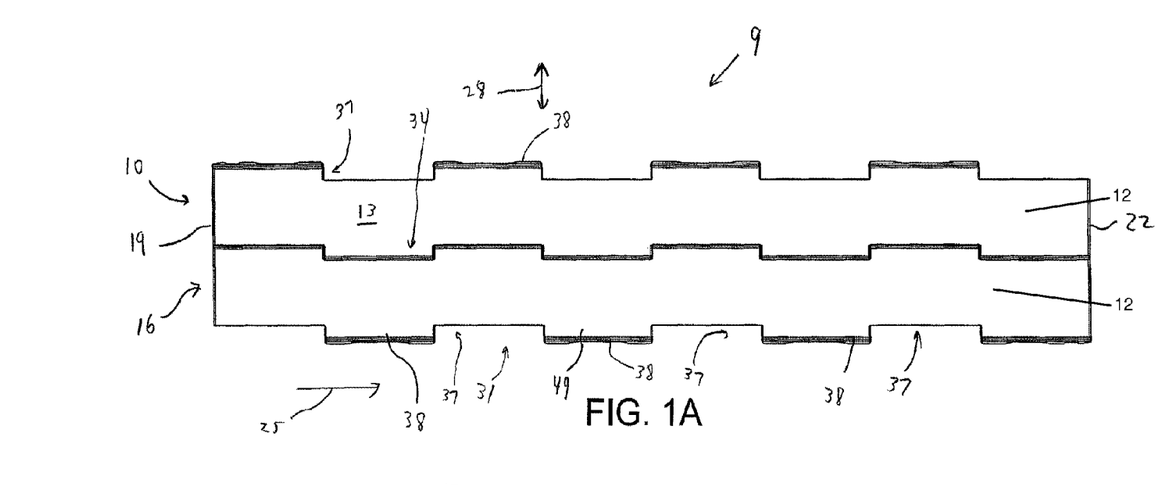
FIG. 1A is a top plan view of a portion of a belt according to the present invention.

In FIG. 1A, a portion of a belt 9 is shown. A first module 10 is designed for easy cleaning with a closed flat top surface 13. Also, the number of link ends is reduced to reduce the number of hinge areas. A second module 16 is intercalated with the first module 10. The modules 10, 16 extend from a first side edge 19 to a second side edge 22 in a transverse direction indicated by arrow 25. The modules 10, 16 comprise an intermediate section 12. As shown, the modules are assembled as chains with the modules 10, 16 extending the full width of the belt 9. As will be evident to those of ordinary skill in the art based on this disclosure, the chain configuration eliminates the gaps between modules that are present when the belt 9 is assembled in a bricklayed configuration with several modules in each row. The modules 10, 16 are end-to-end reversible. Alternatively, they can be designed as unidirectional. The conveying direction is indicated by arrow 28. Each belt has a leading edge 31 and a trailing edge 34. The edges 31, 34 have alternating openings 37 and protrusions 38 that define the shape of the edges 31, 34. The protrusions 38 comprise a plate 46 (Fig. 1b) that connects first link ends 40, 43 which extend from the intermediate section 12 in the same direction as described below. The protrusions 38 of module 10 fit into the openings 37 of adjacent module 16 when the modules 10, 16 are intercalated.

Figure 1B:
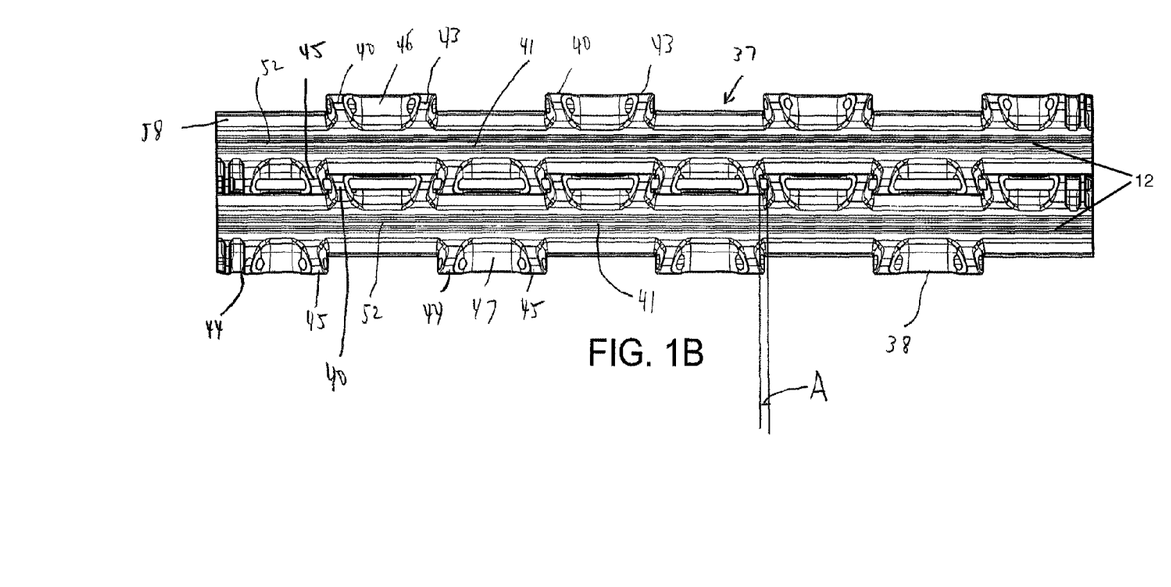
FIG. 1B is a bottom plan view of the belt of FIG. 1A with a conventional transverse rib.
Figure 2A:
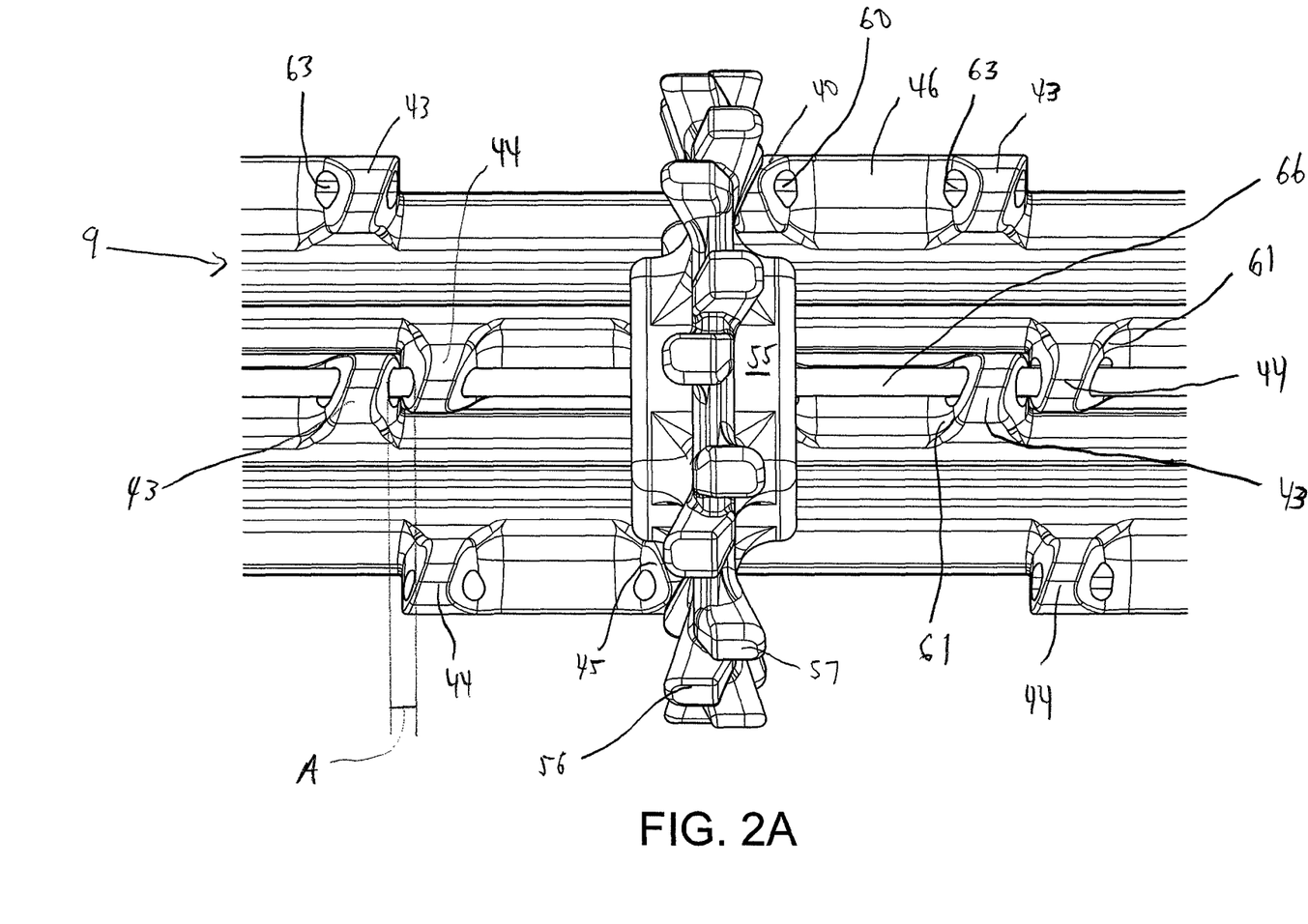
FIG. 2A is a bottom plan view of the typical prior art sprocket engagement over the hinge area.

Turning to FIG. 1B, the modules 10, 16 of the present invention are shown with a standard transverse rib 41 for conventional sprocket engagement. The first link ends 40, 43 are disposed in pairs connected by the plate 46. The plate 46 has a top surface 49 (FIG. 1A) that is coplanar with the surface 13. The number of first link ends 40, 43 is reduced to reduce the number of gaps to be cleaned. The arrangement of the first link ends 40, 43 in pairs as shown provides for reducing the number of link ends 40, 43 while maintaining sufficient belt strength. Second link ends 44, 45 extend in the opposite direction from first link ends 40, 43 and are connected by a plate 47. As best shown in FIG. 2a, when the adjacent modules are intercalated a first link end 40 is disposed adjacent to a second link end 45 on the adjacent module with minimal transverse distance A between them. Each of the modules 10, 16 has the center transverse rib 41 for stiffening the belt 9 and at the same time allowing a driving sprocket 55 (FIGS. 2a-2c) to be engaged to submit the driving torque. The bottom surface 58 of the module 31 is flat for easy cleaning.

Figure 2B:
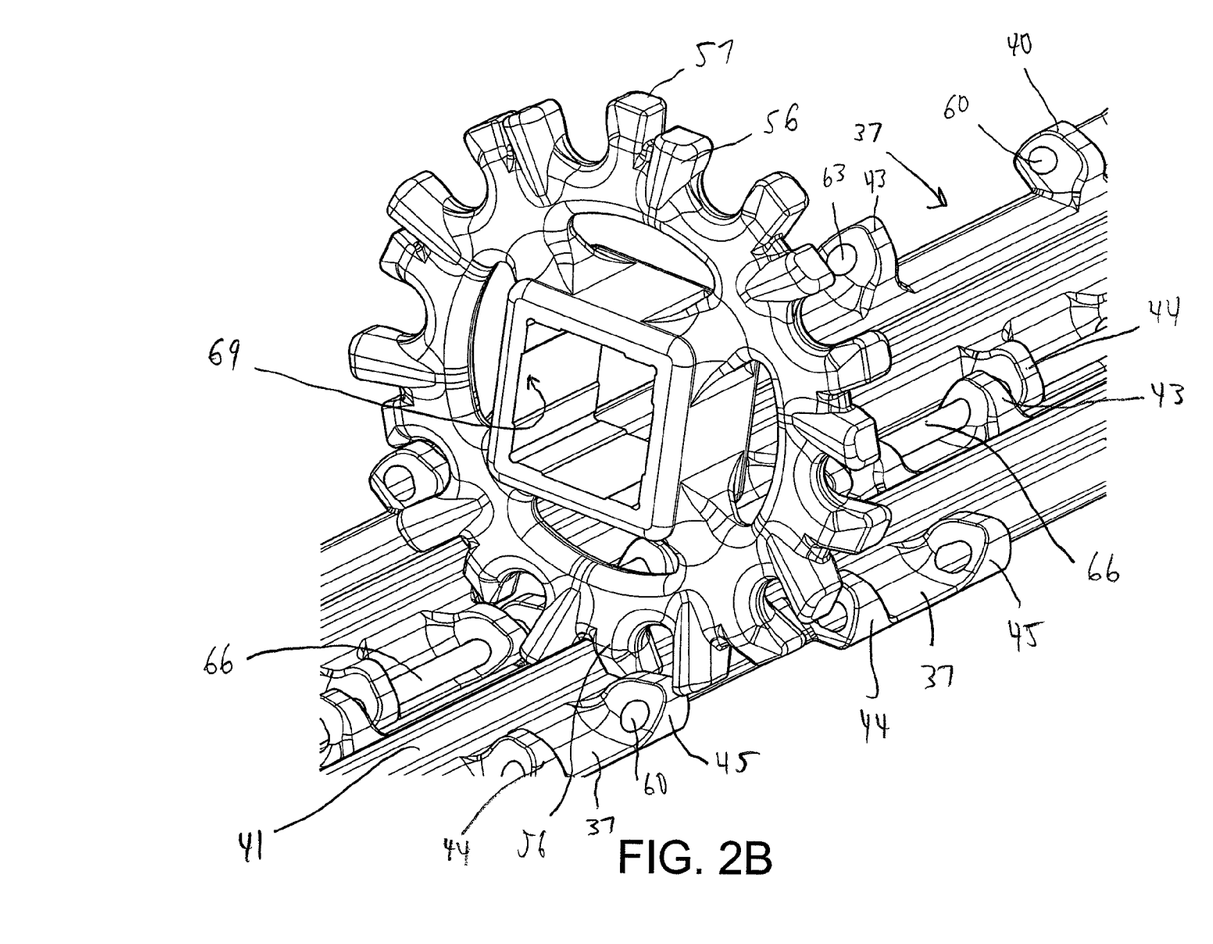
FIG. 2B is perspective view of the sprocket and belt show in FIG. 2A.
Figure 2C:
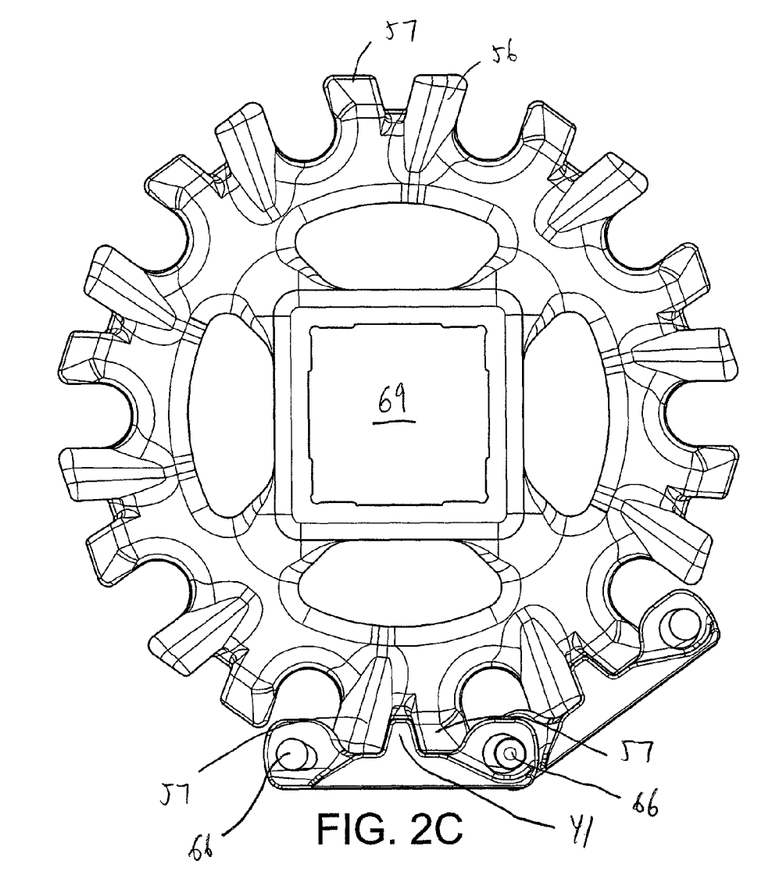
FIG. 2C is a side elevational view of the sprocket and belt shown in FIG. 2A.

In FIGS. 2a-2c, the engagement of the sprocket 55 with the belt 9 in the known manner is shown. The sprocket 55 engages with the belt over the hinge area where the adjacent link ends 43, 44 are located. The sprocket teeth 56, 57 abut against the side faces 61 of the links to provide tracking. Accordingly, when the belt 9 passes over the sprocket 55, the hinge gaps are covered, accessibility for cleaning is hindered, and the sprocket teeth 56, 57 may press food in to the hinge gaps where it is difficult to remove. The first link ends 40, 43 have transverse pivot rod openings 60, 63 for receiving a pivot rod 66 when adjacent modules are intercalated and the transverse openings 60, 63 are placed in alignment. As shown in FIG. 2b, the sprocket 55 has a central opening 69 for receiving a shaft (not shown). The opening 69 is square but other shapes may also be suitable. The engagement of the sprocket tooth 56 with link end 45 for tracking is shown at the bottom center portion of FIG. 2b. Turning to FIG. 2c, the engagement of the sprocket teeth 56, 57 with rib 41 is best shown.

Figure 3:
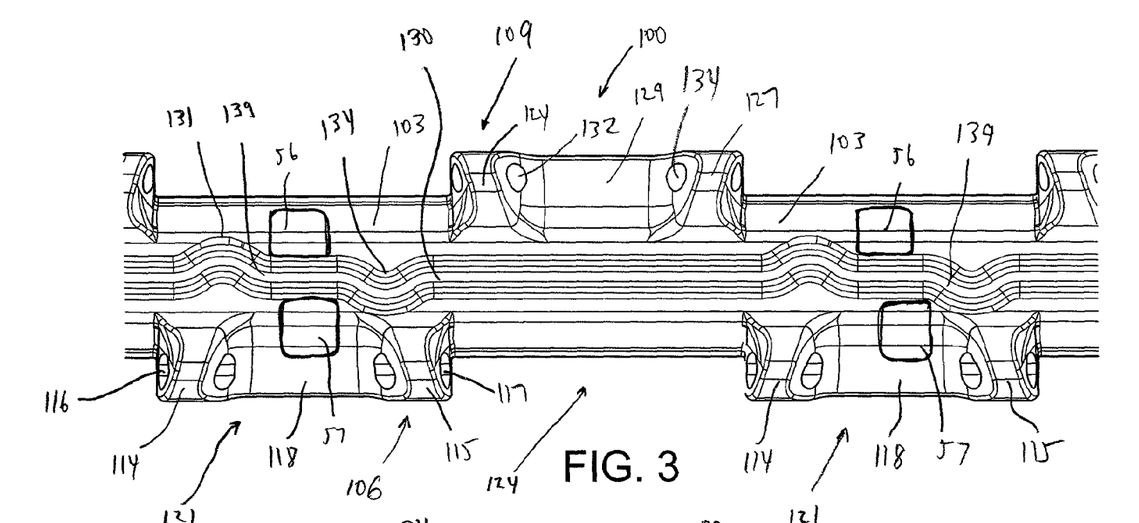
FIG. 3 is a bottom plan view of a module according to the present invention.
Figure 6:
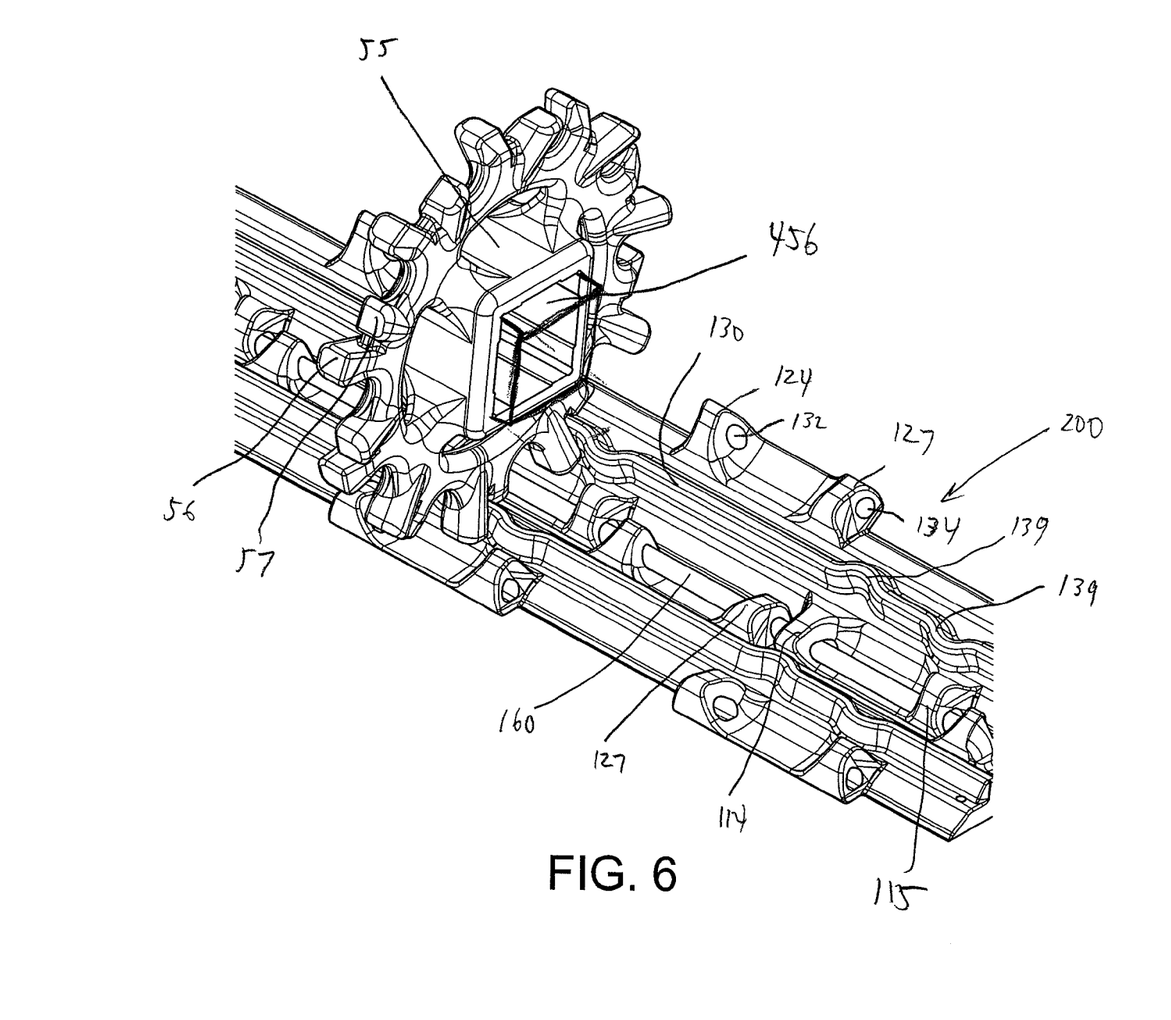
FIG. 6 is a perspective view of the sprocket engaged on the center transverse rib between the links of the hinges leaving the link gaps freely accessible for cleaning; and, FIG. 7 is a bottom plan view showing two sprockets located between the link pairs such that the hinge area is exposed for cleaning.

In FIG. 3, the bottom surface 103 of a module 100 according to the present invention is shown. The bottom surface 103 may be substantially smooth and flat for cleaning purposes. The module 100 has a leading edge 106 and a trailing edge 109. The module 100 may be formed in different widths depending on the size of the belt and whether the belt is formed like a chain or is bricklayed. First link ends 114 and 115 extend in a first direction. The first link ends 114 and 115 are connected by a plate 118 to form a first link structure 121. The link ends 114, 115 have transverse pivot rod openings 116, 117 for receiving a pivot rod 160 (FIG. 6). A plurality of first link structures 121 extend along the leading edge 106. Openings 124 are disposed between each successive link structure 121. A second plurality of link ends 124, 127 extend opposite the first link ends 114, 115 and are connected by a plate 129. Second link ends have transverse pivot rod openings 132, 134. The module 100 has a center transverse rib 130 that is corrugated between the link pairs. The corrugated section 139 has alternating peaks 131 and valleys 134 in positions between the link ends 114, 115 through the middle of the link structure 121. The corrugated section 139 allows for positioning of the sprocket 55 between the sets of adjacent link ends 114, 115 such that the hinge area remains open for cleaning access. Tracking is provided by engagement of the sprocket teeth 56, 57 with the rib corrugation 139. The rib 130 provides for engagement of the sprocket 55 in between the link ends 114, 115 of the link structure 121 and therefore away from the hinge gaps where first and second link ends from intercalated modules are disposed adjacent to each other. As shown in FIG. 3, the sprocket teeth 56, 57 engage with the rib 130 and the guiding function is provided by the corrugated section 139 that engages with the teeth 56, 57.

Figure 4:
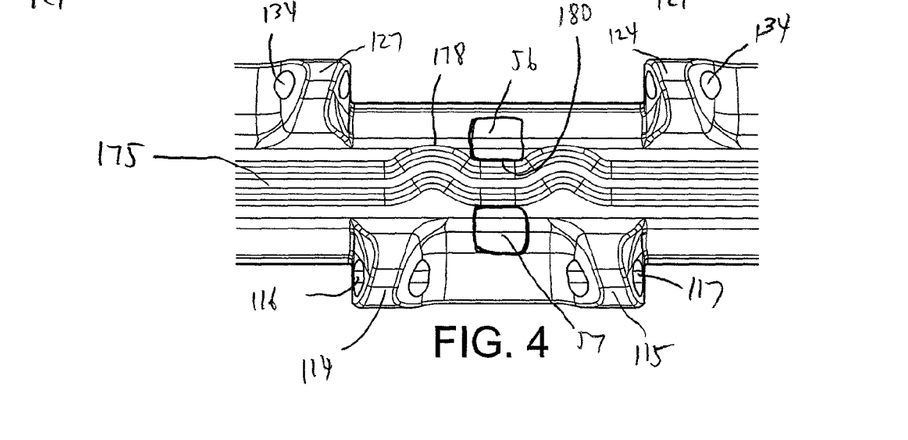
FIG. 4 is a bottom plan view of an alternate embodiment of the module according to the present invention.

In FIG. 4, an alternate embodiment of the transverse rib is shown. The transverse rib 175 is approximately sinusoidal in shape with alternating peaks 178 and valleys 180. One of the teeth engages the rib 175 in a valley and the two sides of the rib 175 bordering the valley engage the sides of one of the sprocket teeth to provide for guidance.

Figure 5:
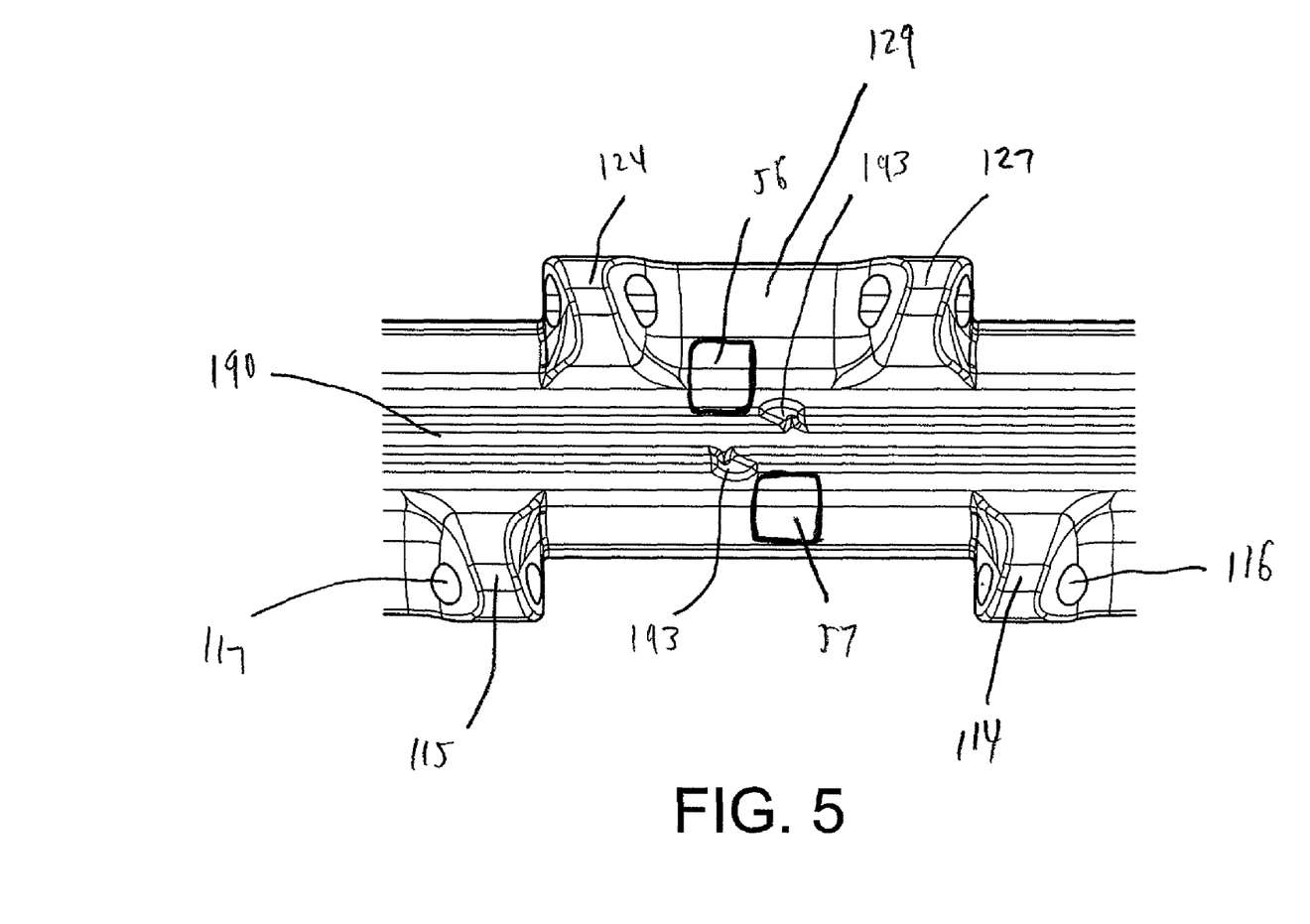
FIG. 5 is a bottom plan view of another alternate embodiment of the module according to the present invention.

In FIG. 5, another embodiment of the present invention is shown. A central rib 190 has at least one protuberance 193 that engages with the sprocket teeth to provide guidance for tracking.

It is also possible to have tracking from the edge of the belt. With a straight transverse rib as shown in FIG. 1B, the sprocket 55 may be fixed to a shaft 456 (FIG. 6) in combination with edge guiding of the belt or the like, as will be evident to those of ordinary skill in the art based on this disclosure, to maintain alignment of the sprockets 55 in the middle of the link structures.

Figure 7:
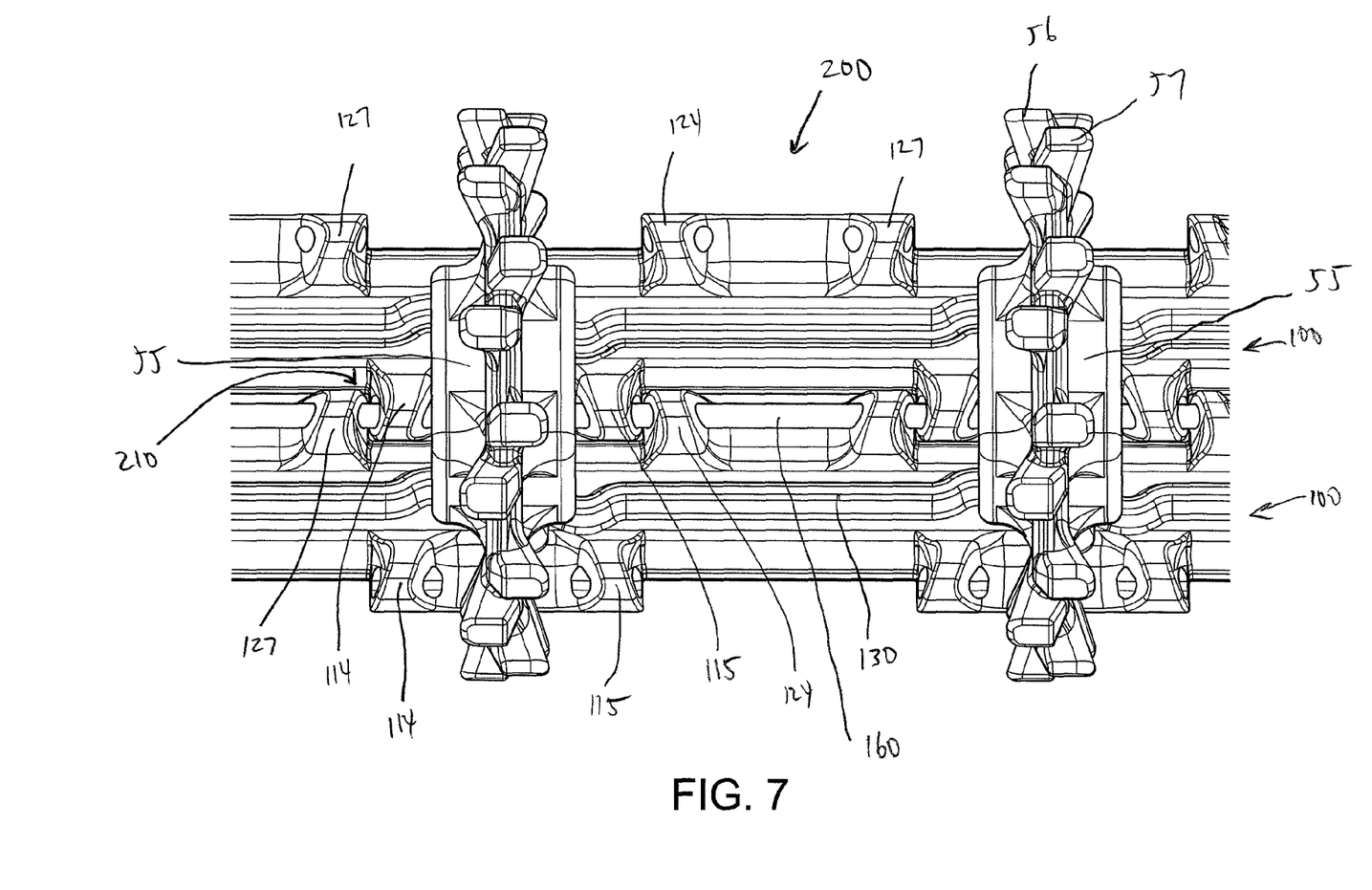

In FIGS. 6-7, a belt 200 is shown with modules 100 having transverse ribs 130. As best shown in FIG. 7, the sprocket 55 engages the belt modules 100 away from the hinge gap areas 210 where first and second link ends 114, 127 from adjacent modules 100 are disposed adjacent to each other on opposite sides of the pivot rod 160. The sprocket 55 is positioned such that it engages the modules 100 in the midportion of the first link structure 121 between the first link ends 114, 115. Accordingly, the hinge gap areas are not covered by the sprocket 55 and are more accessible for cleaning.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A belt module and sprocket combination, comprising:
 a belt module having an intermediate section and a transverse rib;
 a plurality of first link structures extending from the intermediate section in a direction of belt travel, each first link structure comprising:
  at least two first link ends extending in a same direction; and
  a first link structure plate spanning the at least two first link ends;
 a plurality of second link structures extending from the intermediate section opposite the first link structures, each second link structure comprising:
  at least two second link ends extending in a same direction, opposite the direction of the at least two first link ends; and
  a second link structure plate spanning the at least two second link ends;
 wherein the first and second link structures are offset in the transverse direction such that the first link structures are capable of fitting into openings between the second link structures when adjacent modules are intercalated; and
 wherein at least one of the first link ends of the module and at least one of the second link ends of an adjacent module are disposed proximate to each other with respect to the transverse direction, the module having a transverse rib;

a sprocket capable of engaging with the transverse rib and arranged such that the sprocket engages with the module between the link ends of one of a first and second link structure.

2. The belt module and sprocket combination of claim 1, wherein the sprocket engages the module in a midportion of the first link structure.

3. The belt module and sprocket combination of claim 1, wherein the transverse rib is corrugated between the first link ends on the first link structure.

4. The belt module and sprocket combination of claim 1, wherein the sprocket is fixed to a shaft.

5. The belt module and sprocket combination of claim 1, wherein at least a portion of the transverse rib has a substantially sinusoidal shape, the portion being located between the link ends of one of a first and second link structure.

6. The belt module and sprocket combination of claim 1, wherein the transverse rib provides tracking surfaces for guiding the belt on only one side of the transverse rib.

7. The belt module and sprocket combination of claim 1, wherein the transverse rib has at least one protuberance for engaging the sprocket.

8. A method of positioning a sprocket on a modular belt, comprising:
   providing a belt module having:
      an intermediate section;
      a transverse rib;
      a plurality of first link structures extending from the intermediate section in a direction of belt travel, each first link structure having:
         at least two first link ends extending in a same direction; and
         a first link structure plate spanning the at least two first link ends;
      a plurality of second link structures extending from the intermediate section opposite the first link structures, each second link structure comprising:
         at least two second link ends extending in a same direction, opposite the direction of the at least two first link ends; and
         a second link structure plate spanning the at least two second link ends;
      wherein the first and second link structures are offset in the transverse direction such that the first link structures are capable of fitting into openings between the second link structures when adjacent modules are intercalated; and
      wherein at least one of the first link ends of the module and at least one of the second link ends of an adjacent module are disposed proximate to each other with respect to the transverse direction; and
   engaging a sprocket with the module such that the sprocket engages with the module between the link ends of one of a first and second link structure.

9. The method of claim 8, wherein the sprocket engages the module in a midportion of the first link structure.

10. The method of claim 8, wherein the transverse rib is corrugated between the first link ends on the first link structure.

11. The method of claim 8, wherein the sprocket is fixed to a shaft.

12. The method of claim 8, wherein at least a portion of the transverse rib has a substantially sinusoidal shape, the portion being located between the link ends of one of a first and second link structure.

13. The method of claim 8, wherein the transverse rib provides tracking surfaces for guiding the belt on only one side of the rib.

14. The method of claim 8, wherein the transverse rib has at least one protuberance for engaging with at least one tooth on the sprocket.

* * * * *